(12) United States Patent
Heo et al.

(10) Patent No.: US 10,325,567 B2
(45) Date of Patent: Jun. 18, 2019

(54) VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventors: Jong Hyuck Heo, Yongin-si (KR); Gideok Kwon, Seoul (KR); Jong Bok Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/493,657

(22) Filed: Apr. 21, 2017

(65) Prior Publication Data

US 2018/0122328 A1 May 3, 2018

(30) Foreign Application Priority Data

Nov. 1, 2016 (KR) .......................... 10-2016-0144490

(51) Int. Cl.
*G06F 1/16* (2006.01)
*G09G 5/00* (2006.01)
(Continued)

(52) U.S. Cl.
CPC .............. *G09G 5/003* (2013.01); *B60R 11/02* (2013.01); *B60R 11/0241* (2013.01);
(Continued)

(58) Field of Classification Search
CPC .... G09G 5/003; G09G 5/363; G09G 2380/10; G09G 2320/08; G09G 2380/01;
(Continued)

(56) References Cited

U.S. PATENT DOCUMENTS 6,178,818 B1 * 1/2001 Plochinger ........... G01D 5/2405
361/284
6,663,010 B2 * 12/2003 Chene ................ B60H 1/00642
236/51
(Continued)

FOREIGN PATENT DOCUMENTS

JP         2015181321 A       10/2015
KR    10-2014-0045966 A        4/2014
(Continued)

*Primary Examiner* — Grant Sitta
(74) *Attorney, Agent, or Firm* — Brinks Gilson & Lione

(57) ABSTRACT

The present disclosure provides a vehicle and method for controlling the vehicle, which relates to a technology for reconstructing a screen to be displayed in a display area based on a display area of an external device held in a holding groove inside the vehicle. The vehicle includes: a holding groove configured to hold an external device when the external device is inserted thereto; an electrode positioned in the holding groove that is configured to transmit a frequency signal to the external device; a controller configured to generate image data to reconstruct a screen to be displayed on the external device according to information about a display area of the external device set up by the external device based on the frequency signal; and a communicator configured to transmit the image data to the external device.

20 Claims, 20 Drawing Sheets

(51) Int. Cl.
*G09G 5/36* (2006.01)
*B60R 11/00* (2006.01)
*B60R 11/02* (2006.01)
*G06F 3/041* (2006.01)
*G06F 3/044* (2006.01)
*G06F 3/147* (2006.01)

(52) U.S. Cl.
CPC ........ *B60R 11/0252* (2013.01); *G06F 1/1632* (2013.01); *G06F 3/044* (2013.01); *G06F 3/0416* (2013.01); *G06F 3/147* (2013.01); *G09G 5/363* (2013.01); *B60R 2011/0005* (2013.01); *B60R 2011/0007* (2013.01); *B60R 2011/0075* (2013.01); *G09G 2320/08* (2013.01); *G09G 2380/10* (2013.01)

(58) Field of Classification Search
CPC ............. B60R 11/02; B60R 2011/0005; B60R 11/0252; B60R 11/0241; B60R 2011/0007; B60R 2011/0075; G06F 1/1632; G06F 3/0416; G06F 3/044; G06F 3/147

See application file for complete search history.

(56) References Cited

U.S. PATENT DOCUMENTS

| | | | | |
|---|---|---|---|---|
| 7,199,787 B2* | 4/2007 | Lee | ............ | G06F 3/038 345/1.1 |
| 7,469,951 B2* | 12/2008 | Welschholz | ............ | B60R 7/06 296/37.12 |
| 7,477,919 B2* | 1/2009 | Warren | ............ | H04M 1/7253 455/557 |
| 7,853,404 B2* | 12/2010 | Allen | ............ | G01C 21/26 455/456.3 |
| 7,900,988 B2* | 3/2011 | Ryu | ............ | B60R 11/0235 224/483 |
| 8,143,982 B1* | 3/2012 | Lauder | ............ | G06F 1/1626 206/320 |
| 8,194,133 B2* | 6/2012 | DeWind | ............ | B60K 35/00 348/148 |
| 8,515,502 B2* | 8/2013 | Liu | ............ | H04M 1/0245 455/566 |
| 8,548,532 B1* | 10/2013 | Ng | ............ | H04M 1/274516 381/150 |
| 8,996,386 B2* | 3/2015 | Alasry | ............ | G10L 15/06 345/1.1 |
| 9,001,035 B2* | 4/2015 | Chow | ............ | G06F 3/0482 345/156 |
| 9,126,483 B2* | 9/2015 | Aoki | ............ | B60K 37/02 |
| 9,154,923 B2* | 10/2015 | Bai | ............ | H04L 67/12 |
| 9,628,597 B1* | 4/2017 | Andersen | ............ | H04M 1/04 |
| 9,731,602 B2* | 8/2017 | Kim | ............ | G06F 1/1601 |
| 9,862,327 B2* | 1/2018 | Huebner | ............ | B60R 7/06 |
| 10,059,205 B2* | 8/2018 | Woodhouse | ............ | B60K 35/00 |
| 2003/0006892 A1* | 1/2003 | Church | ............ | B60K 35/00 340/439 |
| 2005/0049006 A1* | 3/2005 | Lee | ............ | G06F 3/0481 455/566 |
| 2005/0218706 A1* | 10/2005 | Schikora | ............ | B64D 11/0015 297/217.4 |
| 2006/0103513 A1* | 5/2006 | Ihara | ............ | H04M 1/04 340/435 |
| 2006/0108820 A1* | 5/2006 | Vican | ............ | B60R 11/0235 296/37.12 |
| 2006/0286944 A1* | 12/2006 | Songwe, Jr. | ............ | B60K 35/00 455/99 |
| 2007/0101039 A1* | 5/2007 | Rutledge | ............ | G06F 1/1632 710/303 |
| 2007/0176797 A1* | 8/2007 | Rhodes | ............ | B60K 35/00 340/995.15 |
| 2008/0211693 A1* | 9/2008 | Okuno | ............ | G01C 21/265 340/995.26 |
| 2009/0058429 A1* | 3/2009 | Harris | ............ | G06F 1/1616 324/686 |
| 2009/0128307 A1* | 5/2009 | Hentsch | ............ | B60K 35/00 340/425.5 |
| 2009/0195513 A1* | 8/2009 | Dybalski | ............ | G06F 3/0488 345/173 |
| 2010/0260350 A1* | 10/2010 | Chutorash | ............ | B60K 35/00 381/86 |
| 2010/0288567 A1* | 11/2010 | Bonne | ............ | B60K 37/06 178/18.01 |
| 2011/0145863 A1* | 6/2011 | Alsina | ............ | G06F 3/0482 725/44 |
| 2011/0242136 A1* | 10/2011 | Yamada | ............ | G01C 21/367 345/660 |
| 2012/0001914 A1 | 1/2012 | Pan et al. | | |
| 2012/0183221 A1* | 7/2012 | Alasry | ............ | G10L 15/06 382/181 |
| 2012/0206126 A1* | 8/2012 | Froniewski | ............ | H03K 17/975 324/76.11 |
| 2012/0242462 A1* | 9/2012 | Nagara | ............ | G06F 1/1632 340/407.1 |
| 2012/0242473 A1* | 9/2012 | Choi | ............ | B60W 50/14 340/441 |
| 2013/0127724 A1* | 5/2013 | Liu | ............ | G06F 1/1616 345/168 |
| 2013/0222323 A1* | 8/2013 | McKenzie | ............ | G06F 1/169 345/174 |
| 2013/0241720 A1* | 9/2013 | Ricci | ............ | G06F 3/0486 340/425.5 |
| 2013/0328825 A1* | 12/2013 | Brown | ............ | G06F 3/01 345/174 |
| 2014/0274214 A1* | 9/2014 | Kim | ............ | H04M 1/0266 455/566 |
| 2014/0332441 A1* | 11/2014 | Jayetileke | ............ | A45C 11/00 206/774 |
| 2015/0029149 A1* | 1/2015 | Andersson | ............ | G06F 3/048 345/174 |
| 2015/0116235 A1* | 4/2015 | Fujisawa | ............ | G06F 3/041 345/173 |
| 2015/0146299 A1* | 5/2015 | Koseki | ............ | G02B 27/0101 359/632 |
| 2015/0154935 A1* | 6/2015 | Won | ............ | G09G 5/006 345/156 |
| 2015/0155903 A1* | 6/2015 | Jang | ............ | H04B 1/3888 455/575.8 |
| 2015/0172432 A1* | 6/2015 | An | ............ | H04B 1/3883 455/556.1 |
| 2015/0226964 A1* | 8/2015 | Sasaki | ............ | G02B 27/0149 359/631 |
| 2015/0229754 A1* | 8/2015 | Won | ............ | G06F 1/165 455/575.8 |
| 2015/0280770 A1* | 10/2015 | Rhee | ............ | H04B 1/3888 455/575.8 |
| 2015/0288056 A1* | 10/2015 | Choi | ............ | H01Q 1/44 343/702 |
| 2015/0346779 A1* | 12/2015 | Chae | ............ | G06F 1/1677 715/773 |
| 2016/0097651 A1* | 4/2016 | Jung | ............ | B60K 37/06 701/428 |
| 2016/0267886 A1* | 9/2016 | Kang | ............ | G09G 5/377 |
| 2016/0337595 A1* | 11/2016 | Kim | ............ | G06F 1/1677 |
| 2017/0064056 A1* | 3/2017 | Uhlig | ............ | H04M 1/04 |
| 2017/0138901 A1* | 5/2017 | Norton | ............ | B01L 3/50273 |
| 2017/0243531 A1* | 8/2017 | Moon | ............ | G09G 3/2092 |
| 2017/0249041 A1* | 8/2017 | Moller | ............ | G06F 3/0414 |

FOREIGN PATENT DOCUMENTS

| | | |
|---|---|---|
| KR | 20150095284 A | 8/2015 |
| KR | 101587436 B1 | 1/2016 |
| KR | 10-2016-0065286 A | 6/2016 |

* cited by examiner

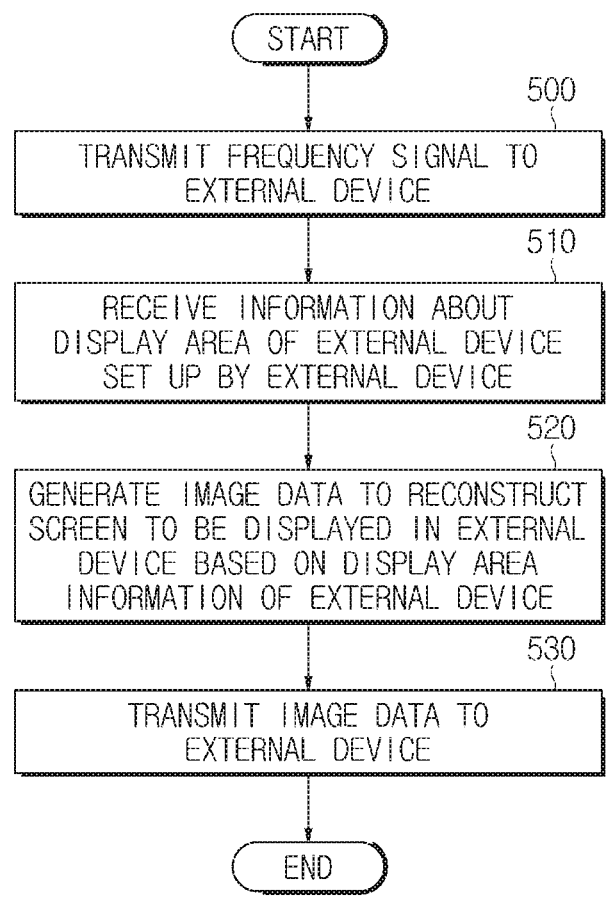

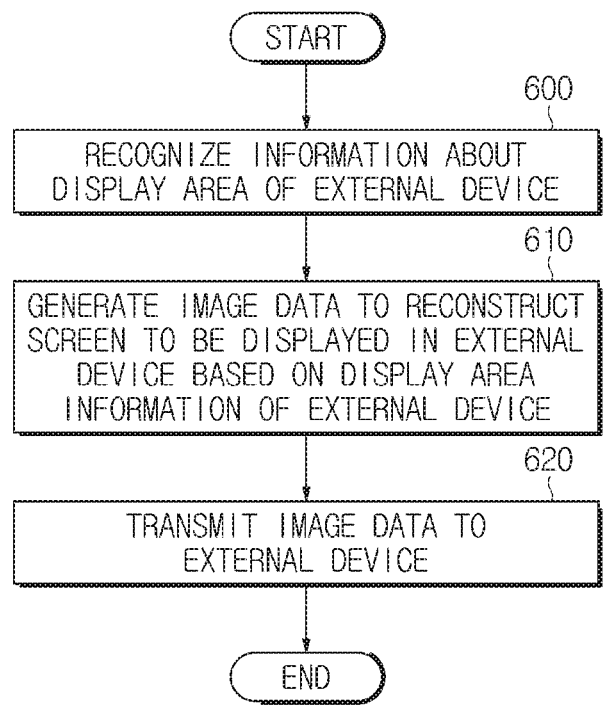

VEHICLE AND METHOD FOR CONTROLLING THE SAME

CROSS-REFERENCE TO RELATED APPLICATION

This application claims priority to and the benefit of Korean Patent Application No. 10-2016-0144490, filed on Nov. 1, 2016, which is incorporated herein by reference in its entirety.

FIELD

The present disclosure relates to a vehicle and method for controlling the vehicle, and more particularly, to reconstructing a screen to be displayed on a display area based on a display area of an external device held in a holding groove inside the vehicle.

BACKGROUND

The statements in this section merely provide background information related to the present disclosure and may not constitute prior art.

A vehicle is generally equipped with a multimedia system, including functions like playing music, playing video, and further performing GPS navigation. Since user demands for the multimedia system are being increased day by day, the multimedia functions are often performed by an external device arbitrarily installed in the vehicle in addition to the multimedia system built into the vehicle.

However, because there are limitations to installing the external device in the vehicle, pursuing free installation and effectively having multimedia functions simultaneously becomes a difficult task. Accordingly, studies are actively underway these days for technologies to freely hold an external device in vehicles and be able to check out content displayed through a display of the external device at the same time.

SUMMARY

The present disclosure provides a vehicle and method for controlling the vehicle, by which a display area of an external device may be determined depending on signals transmitted from an electrode arranged in a holding groove inside the vehicle, and a screen to be displayed in the display area of the external device held in the holding groove may be reconstructed based on the determined display area.

In accordance with one aspect of the present disclosure, a vehicle includes: a holding groove configured to hold an external device as the external device is inserted thereto; an electrode positioned in the holding groove that is configured to transmit a frequency signal to the external device; a controller configured to generate image data to reconstruct a screen to be displayed in the external device according to information about a display area of the external device set up by the external device based on the frequency signal; and a communicator configured to transmit the image data to the external device.

The holding groove may include a pattern groove formed inside of the holding groove in a laser process.

At least one of the electrode may be positioned in the pattern groove.

The electrode may be configured to transmit a frequency signal to the external device in order to change capacitance of a touch sensor arranged in the external device.

The controller may be configured to generate image data based on the information about a display area of the external device set up by the external device, such that a screen is not displayed in a display area hidden as the external device is inserted into the holding groove.

The controller may be configured to generate image data to reconstruct a layout of a screen to be displayed in a display area of the external device set up by the external device.

The controller may be configured to generate image data to reconstruct at least one of the size, number, type, display area, and display position of contents to be displayed in a display area of the external device set up by the external device.

The vehicle may further include: a frequency generator configured to apply a frequency signal to the electrode, the electrode may transmit the frequency signal applied from the frequency generator to the external device.

The communicator may be configured to receive the information about a display area of the external device set up by the external device.

The vehicle may further include: a memory configured to store the information about a display area of the external device set up by the external device.

The holding groove may be arranged in at least one of dashboard, center fascia, gearbox, and instrument panel of the vehicle.

In accordance with another aspect of the present disclosure, a vehicle includes: a holding groove configured to hold an external device as the external device is inserted thereto; an identifier positioned in the holding groove that is configured to recognize display area information of the external device; a controller configured to generate image data to reconstruct a screen to be displayed in the external device based on the display area information of the external device; and a communicator configured to transmit the image data to the external device.

The identifier may be configured to recognize the display area information of the external device by at least one way of bar code, QR code, text data, data matrix, recognition pattern, NFC, or RFID.

In accordance with one aspect of the present disclosure, a method for controlling a vehicle includes: transmitting a frequency signal to an external device; receiving information about a display area of the external device set up by the external device based on the frequency signal; generating image data to reconstruct a screen to be displayed in the external device based on the display area information of the external device; and transmitting the image data to the external device.

Transmitting the image data to the external device may include transmitting a frequency signal to the external device in order to change capacitance of a touch sensor arranged in the external device.

Generating image data may include generating image data based on the information about a display area of the external device set up by the external device, such that a screen is not displayed in a display area hidden as the external device is inserted into a holding groove arranged in the vehicle.

Generating image data may include generating image data to reconstruct a layout of a screen to be displayed in a display area of the external device set up by the external device.

Generating image data may include generating image data to reconstruct at least one of the size, number, type, display area, and display position of contents to be displayed in a display area of the external device set up by the external device.

The method for controlling a vehicle further include: storing the information about a display area of the external device set up by the external device.

In accordance with another aspect of the present disclosure, a method for controlling a vehicle includes: recognizing information about a display area of an external device; generating image data to reconstruct a screen to be displayed in the external device based on the display area information of the external device; and transmitting the image data to the external device.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 19 is a flowchart illustrating a method for controlling a vehicle; and

FIG. 20 is a flowchart illustrating a method for controlling a vehicle.

DETAILED DESCRIPTION

Figure 1:
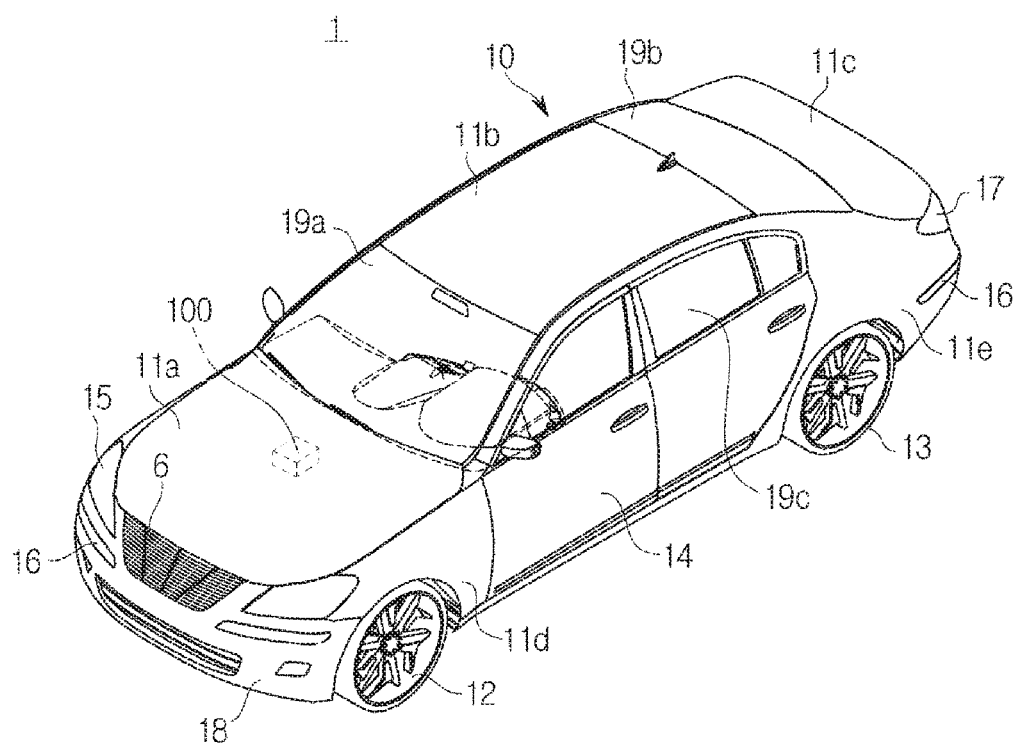
FIG. 1 is a perspective view schematically illustrating the exterior of a vehicle.

The following description is merely exemplary in nature and is not intended to limit the present disclosure, application, or uses. It should be understood that throughout the drawings, corresponding reference numerals indicate like or corresponding parts and features.

Like numerals refer to like elements throughout the specification. Not all elements of forms of the present disclosure will be described, and description of what are commonly known in the art or what overlap each other in the forms of the present disclosure will be omitted. The terms as used throughout the specification, such as "~ part", "~ module", "~ member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It is to be understood that the singular forms "a," "an," and "the" include plural references unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 is a perspective view schematically illustrating the exterior of a vehicle.

Referring to FIG. 1, a vehicle 1 may include a car frame 10 that forms the exterior, and wheels 12, 13 for moving the vehicle 1.

The car frame 10 may include a hood 11a for protecting various devices required for driving the vehicle 1, a roof panel 11b that forms an indoor space, a trunk lid 11c of a trunk, front fenders 11d arranged on the sides of the vehicle 1, and quarter panels 11e. There may be a plurality of doors 15 arranged on the sides of the car frame 10 and hinged with the car frame 10.

A front window 19a is arranged between the hood 11a and the roof panel 11b for providing a view ahead of the vehicle 1, and a rear window 19b is arranged between the roof panel 11b and the trunk lid 11c for providing a view behind the vehicle 1. Side windows 19c may also be built into the upper part of the doors 15 to provide side views.

Headlamps 15 may be arranged on the front of the vehicle 1 for lighting a direction in which the vehicle 1 is moving.

Turn signal lamps 16 may also be arranged on the front and back of the vehicle 1 for indicating a direction to which the vehicle 1 is going to make a turn.

The vehicle 1 may blink the turn signal lamp 16 to indicate a direction to turn to. Tail lamps 17 may also be arranged on the back of the vehicle 1. The tail lamps 17 may indicate a state of gear shift, a state of brake operation of the vehicle 1, etc.

At least one vehicle controller 100 may be included in the vehicle 1. The vehicle controller 100 may have a function to perform electronic control over operation of the vehicle 1. The vehicle controller 100 may be installed in any position inside the vehicle 1 according to a selection by the designer. For example, the vehicle controller 100 may be installed between the engine room and the dashboard, or installed inside of the center fascia. The vehicle controller 100 may include at least one processor that is able to receive electric signals, handle the electric signals, and output results of handling the electric signals. The at least one processor may be implemented with at least one semiconductor chip and associated components. The at least one semiconductor chip and associated components are installed on a printed circuit board (PCB) that may be installed inside of the vehicle 1.

Figure 2:
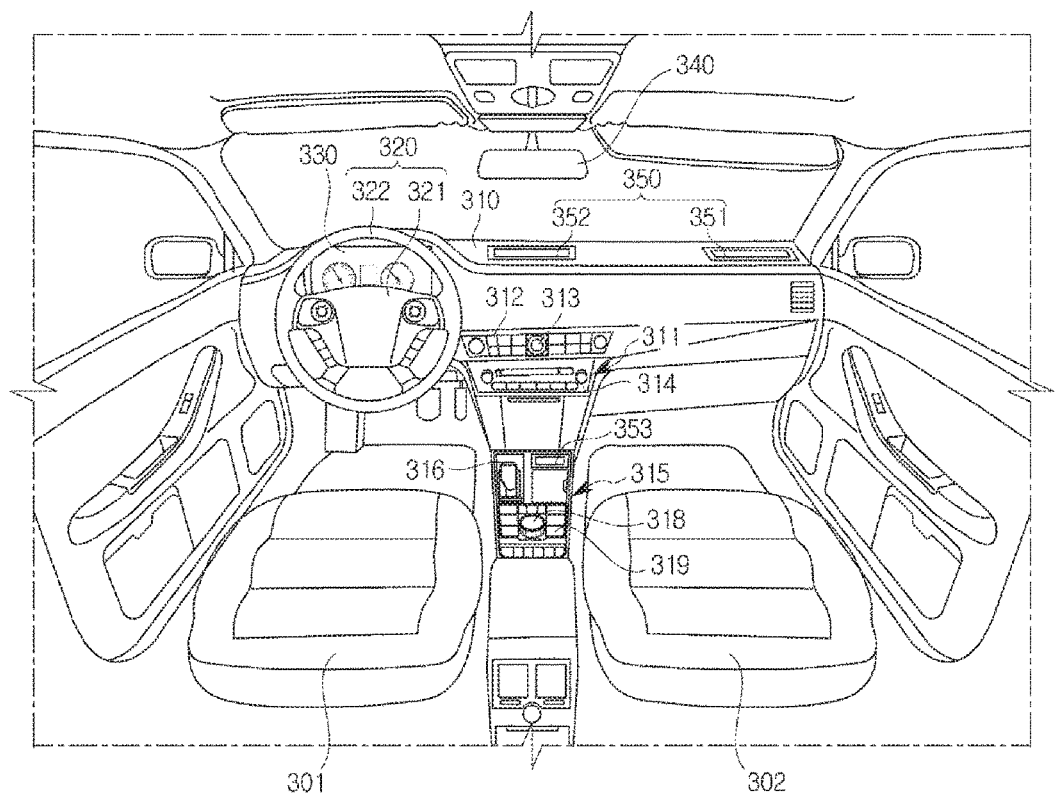
FIG. 2 illustrates internal features of a vehicle.

FIG. 2 illustrates internal features of a vehicle.

Referring to FIG. 2, in an interior 300 of the vehicle 1, there are a driver seat 303, a passenger seat 304 by the driver seat 303, a dashboard 310, a steering wheel 320, and an instrument panel 330.

The dashboard 310 refers to a panel that separates the interior room of the vehicle 1 from the engine room and that has various parts required for driving installed thereon. The dashboard 310 is located ahead of the driver seat 303 and passenger seat 304. The dashboard 310 may include a top panel, a center fascia 311, a gear box 315, and the like.

A holding groove 350 may be formed in the top panel of the dashboard 310. An external device may be held in the holding groove 350 by being inserted thereto, and as shown in FIG. 2, there may be a holding groove 351 formed in the dashboard 310 in front of the passenger seat 302, and a holding groove 352 formed in the dashboard 310 above the center fascia 311.

As will be described below, the holding groove 350 may have an electrode for transmitting a frequency signal to an external device held in the holding groove 350.

The external device held in the holding groove 350 may provide various information in images for the driver or the passenger of the vehicle 1. For example, the external device may visually present various information, such as maps, weather, news, various moving or still images, information regarding status or operation of the vehicle 1, e.g., information about the air conditioner, etc. Furthermore, the external device may provide the driver or passenger with an alert corresponding to a level of danger to the vehicle 1. Specifically, if the vehicle 1 changes lanes, different alerts may be provided to the driver according to different levels of danger. The external device may be implemented as a commonly used navigation system.

The external device may be held in the holding groove 350 formed integrally with the dashboard 310, having some part of the external device exposed. Furthermore, the external device may be held in the holding groove 350 arranged in the middle or in the bottom of the center fascia 311, and besides, in various positions that may be considered by the designer. There are no limitations on where to arrange the holding groove 350, and the holding groove 350 may be arranged in any position.

Behind the dashboard 310, various types of devices, such as a processor, a communication module, a Global Positioning System (GPS) module, a storage, etc., may be installed. The processor installed in the vehicle 1 may be configured to control various electronic devices installed in the vehicle 1, and may serve as the vehicle controller 100. The aforementioned devices may be implemented using various parts, such as semiconductor chips, switches, integrated circuits, resistors, volatile or nonvolatile memories, PCBs, and/or the like.

The center fascia 311 may be installed in the middle of the dashboard 310, and may have input means 312 to 314 for inputting various instructions related to the vehicle 1. The input means 312 to 314 may be implemented with mechanical buttons, knobs, a touch pad, a touch screen, a stick-type manipulation device, a trackball, or the like. The driver may control many different operations of the vehicle 1 by manipulating the input means 311 to 314, 318, 319.

The gear box 315 is located below the center fascia 311 between the driver seat 303 and the passenger seat 304. In the gear box 315, a transmission 316, various input means 318, 319, etc., are included. The input means 318, 319 may be implemented with mechanical buttons, knobs, a touch pad, a touch screen, a stick-type manipulation device, a trackball, or the like, and may be omitted in some forms of the present disclosure.

In the gear box 315, the holding groove 353 for holding the external device may be arranged. The external device may be held in the holding groove 353 by being inserted thereto for providing various information in images for the driver or the passenger of the vehicle 1.

The steering wheel 320 and the instrument panel 330 are located on the dashboard 310 in front of the driver seat 303.

The steering wheel 320 may be rotated in a certain direction by manipulation of the driver, and accordingly, the front or back wheels of the vehicle 1 are rotated, thereby steering the vehicle 1. The steering wheel 320 includes a spoke 321 connected to a rotation shaft and a wheel for gripping 322 combined with the spoke 321. On the spoke 321, there may be an input means for inputting various instructions, and the input means may be implemented with mechanical buttons, knobs, a touch pad, a touch screen, a stick-type manipulation device, a trackball, or the like. The wheel for gripping 322 may have a radial form to be conveniently manipulated by the driver, but is not limited thereto. Inside of at least one of the spoke 321 and the wheel for gripping 322, a vibrator 201 (in FIG. 4) may be installed for allowing at least one of the spoke 321 and the wheel for gripping 322 to vibrate at a certain intensity according to an external control signal. In some forms of the present disclosure, the vibrator 201 may vibrate at various intensities according to external control signals, and accordingly, at least one of the spoke 321 and the wheel 322 for gripping may vibrate at various intensities. With the function of the vibrator 201, the vehicle 1 may provide haptic alerts for the driver. For example, at least one of the spoke 321 and the wheel for gripping 322 may vibrate to an extent that corresponds to a level of danger determined when the vehicle 1 changes lanes. In this way, various alerts may be provided to the driver. Specifically, the higher the level of danger is, the stronger the at least one of the spoke 321 and the handle for gripping 322 vibrates to provide a high level of alert to the driver.

The instrument panel 330 is formed to provide the driver with various information relating to the vehicle 1, such as speed of the vehicle 1, engine rpm, fuel left, temperature of engine oil, flickering of turn signals, a distance traveled by the vehicle, etc. The instrument panel 330 may be implemented with lights, indicators, or the like, and it may be implemented with a display panel as well, in some forms of the present disclosure. In the case that the instrument panel 330 is implemented with the display panel, in addition to the aforementioned information, the instrument panel 330 may provide other various information such as gas mileage, whether various functions of the vehicle 1 are performed, or the like to the driver by displaying them. In one form of the present disclosure, the instrument panel 330 may output and provide different alerts for the user based on different levels of danger to the vehicle 1. Specifically, if the vehicle 1 changes lanes, the instrument panel 330 may provide different alerts to the driver based on differently determined levels of danger.

A room mirror 340 may be arranged on an upper end of the inside of the vehicle 1, and the driver may check out what is behind the vehicle 1 or the interior of the vehicle 1.

Figure 3:
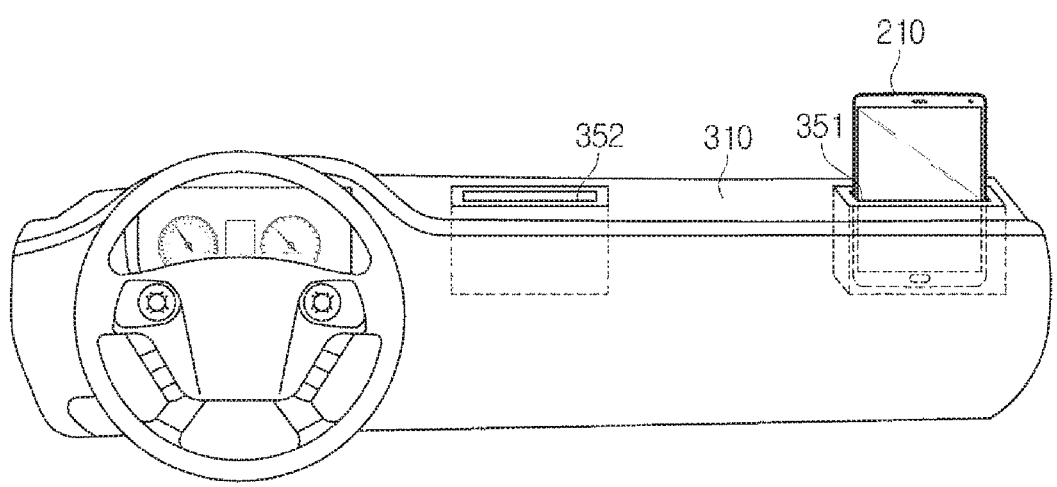
FIGS. 3 and 4 illustrate an external device held in a holding groove formed in a dashboard.
Figure 4:
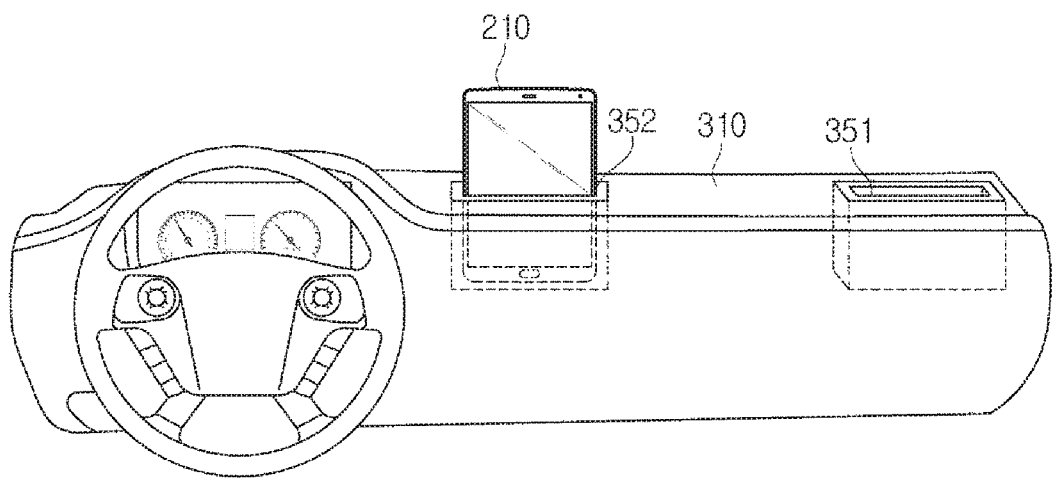
Figure 5:
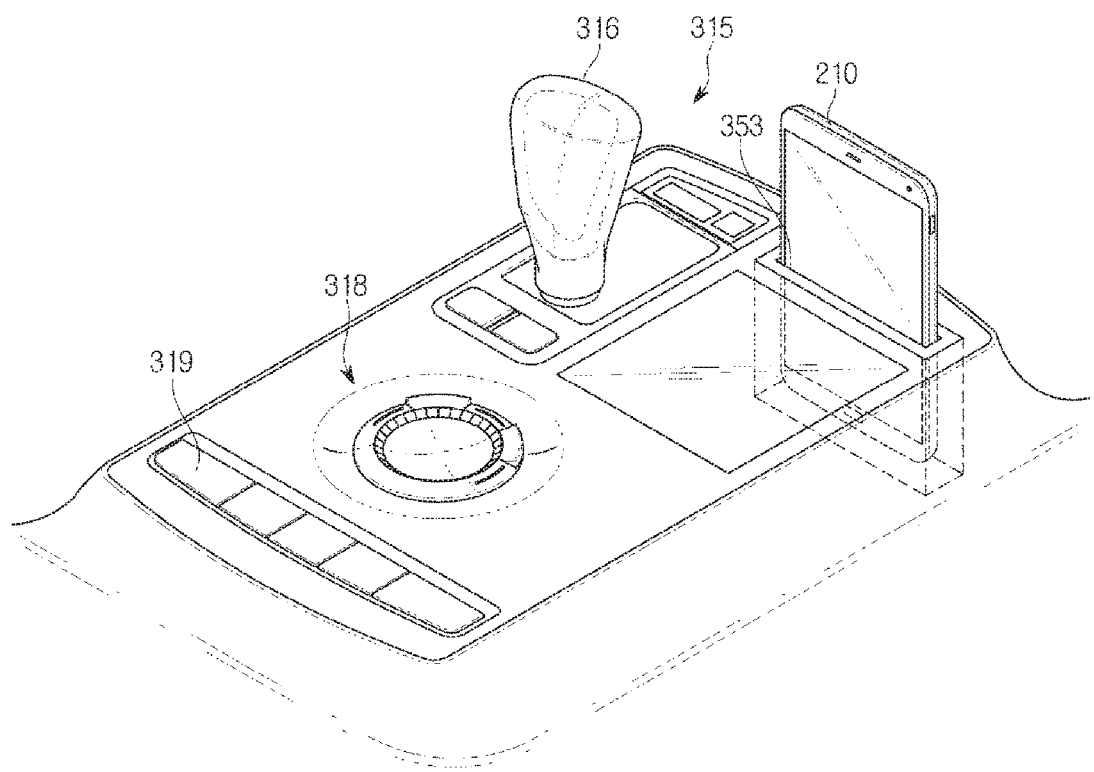
FIG. 5 illustrates an external device held in a holding groove formed in a gear box.

FIGS. 3 and 4 illustrate an external device held in a holding groove formed in a dashboard, and FIG. 5 illustrates an external device held in a holding groove formed in a gear box.

In one form of the present disclosure, an external device 210 may be one of various portable multimedia devices, such as a portable terminal, a tablet, etc., and in the following description, the external device 210 is assumed to be a tablet, for example.

Referring to FIG. 3, the holding groove 351 may be arranged in front of the passenger seat, and the external device 210 may be held in the holding groove 351 by being inserted thereto. The external device 210 to be inserted into the holding groove 351 may come in many different shapes and sizes, and there may be various forms of a direction in which and how the external device 210 is inserted.

Various information may be provided through the external device 210 held in the holding groove 351 for the passenger seated in the passenger seat, and the passenger may watch images on the screen of the external device 210 or receive navigation information. The driver or the passenger may freely attach or detach the external device 210 to or from the holding groove 351, thereby securing portability of the external device 210 and effectively receiving information from the external device 210.

The external device 210 may be more stably positioned by being inserted into the holding groove 351, securing stability of a state of being held while the vehicle 1 is moving, thereby providing steady images or information for the driver or passenger.

The holding groove 351 holding the external device 210 may have a rectangular form as shown in FIG. 3, and width and length of the holding groove 351 may be approximated to the width and thickness of the external device 210. The width and length of the holding groove 351 may vary in a design stage of the vehicle 1.

Referring to FIG. 4, the holding groove 352 may be arranged in the dashboard 310 above the center fascia 311, and the external device 210 may be held in the holding groove 352 by being inserted thereto. Unlike what is shown in FIG. 3, the holding groove 352 shown in FIG. 4 is arranged to be closer to the driver seat than to the passenger seat, so the driver may obtain various information through the external device 210 held in the holding groove 352. For example, the driver may watch images or obtain navigation information through a screen of the external device 210.

In FIGS. 3 and 4, the external device 210 is shown as being inserted into the holding grooves 351 and 352 in the longitudinal direction, alternatively, the external device 210 may be inserted in the lateral direction. That is, there may be various embodiments other than those shown in which the external device 210 is inserted into the holding grooves 351 and 352 and the insertion mode.

Referring to FIG. 5, in the gearbox 315, a transmission lever 316 for gearshift of the vehicle 1, and input means 318, 319 for operating various devices of the vehicle 1 may be arranged.

The input means 318, 319 installed in the gearbox 315 may be positioned such that the user may be able to manipulate the input means 318, 319 while keeping his/her eyes forward. For example, they may be located down the transmission lever 316.

Alternatively, the input means 318, 319 may be installed in the center fascia 311, in the passenger seat, or in the back seat. The input means 318, 319 may be connected to some display devices inside the vehicle 1 for selecting and executing various icons displayed in the display devices. The display devices installed inside the vehicle 1 may include the audio system 312, an AVN system 314, the instrument panel 330, or the like. The display device may be connected to a Heads Up Display (HUD) device or a rear view mirror. For example, the input means 318, 319 may move a cursor or execute an icon displayed on the display device. The icon may include a main menu icon, a menu selection icon, menu setting icon, etc. Furthermore, the user may operate navigation, or set driving conditions, or activate peripheral devices in the vehicle 20 through the input means 318, 319.

In the gear box 315, the holding groove 353 for holding the external device 210 may be arranged. The external device 210 may be held in the holding groove 210 by being inserted thereto and may provide various information in images for the driver or the passenger.

The external device 210 may be held in the holding groove 350 as shown in FIGS. 3 to 5, and the depth of the holding groove 350 may be different in different forms of the present disclosure, in which case the deeper the depth of the holding groove 350, the deeper the external device 210 is inserted thereto and the wider a display area hidden by the holding groove 350. In the past, in a case of inserting the external device 210 into the holding groove 350 to be held, images even in the display area hidden by the holding groove 350 are still output, so the driver or passenger is unable to watch the hidden part of the images.

According to one form of the present disclosure, in the case of inserting the external device 210 into the holding groove 350 to be held, an image is not output in a display area hidden by the holding groove 350, and instead, a display area not hidden by the holding groove 350 is determined and the image data is reconstructed such that the image is output in the non-hidden display area.

Figure 6:
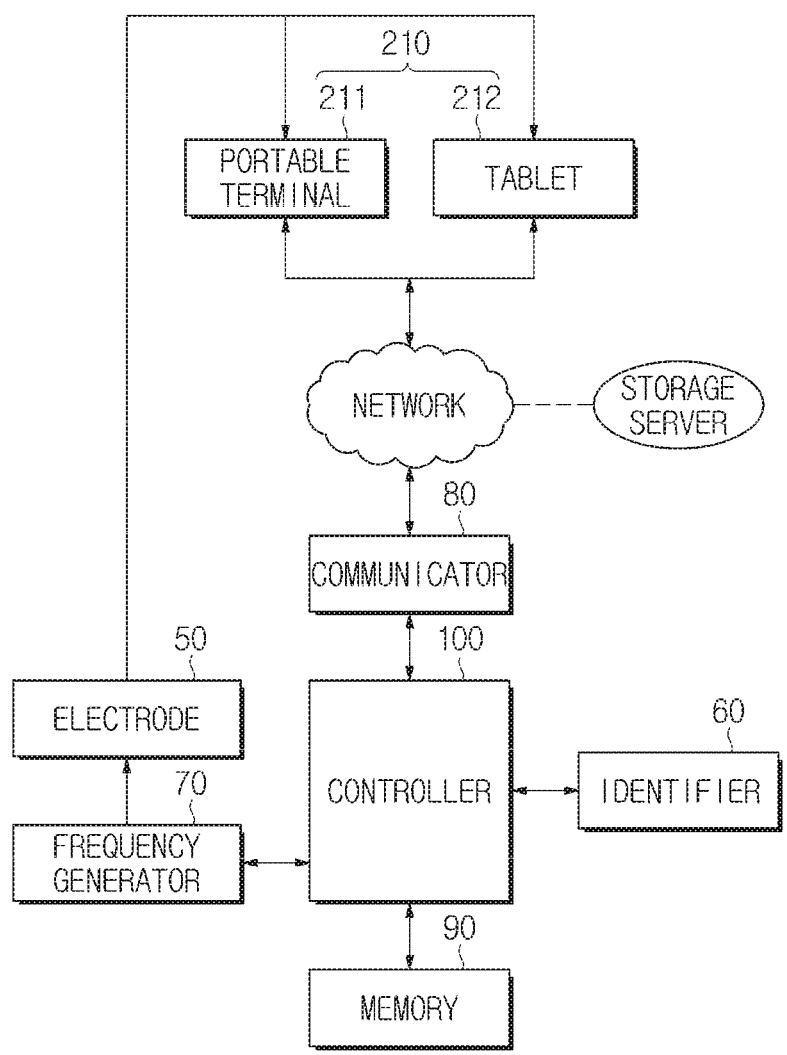
FIG. 6 is a control block diagram of a vehicle.

FIG. 6 is a control block diagram of a vehicle.

Referring to FIG. 6, the vehicle 1 may include an electrode 50 for transmitting a frequency signal to the external device 210 held in the holding groove 350, an identifier 60 arranged in the holding groove 350 for recognizing display area information of the external device 210, a frequency generator 70 for applying a frequency signal to the electrode 50, a communicator 80 for transmitting image data generated by a controller 100 to the external device 210, a memory 90 for storing data related to control of the vehicle 1, and the controller 100 for controlling the respective components related to operation of the vehicle 1.

In one form of the present disclosure, the electrode 50 is arranged in the holding groove 350 for transmitting a frequency signal to the external device 210 inserted into the holding groove 350. The electrode 50 may be arranged in the holding groove 350 in a Laser Directing Structure method using a laser process, or may be implemented as a touch electrode using a Flexible Printed Circuit Board (FPCB).

Configuration and operation of the electrode 50 will be described later in detail in connection with FIGS. 7 to 10.

The identifier 60 may be arranged in the holding groove 350 for recognizing display area information of the external device 210. Specifically, when the external device 210 is held in the holding groove 350, the identifier 60 may recognize display area information stored in the external device 210, and the controller 100 may generate image data for reconstructing a screen to be displayed in the external device 210 based on the recognized display area information.

The identifier 60 may recognize the display area information of the external device 210 in at least one of bar code, QR code, text data, data matrix, recognition pattern, NFC, and RFID methods.

Configuration of the identifier 60 and corresponding method for controlling the vehicle 1 in accordance with one form of the present disclosure will be described later in detail in connection with FIG. 16.

The frequency generator 70 may apply a frequency signal to the electrode 50 formed in the holding groove 350. Specifically, when the external device 210 is held in the holding groove 350, the electrode 50 formed in the holding groove 350 may transmit a frequency signal to the external device 210, and the external device 210 may measure a change in capacitance due to the frequency signal received through e.g., a touch sensor equipped on the front to determine that the external device 210 has been held in the holding groove 350. Furthermore, based on the frequency signal transmitted by the electrode 50, the external device 210 may sense position and depth of the electrode 50 formed in the holding groove 350, and determine areas hidden and not hidden by the holding groove 350 in the entire display area of the external device 210 held in the holding groove 350.

The frequency generator 70 may apply a frequency signal to the electrode 50 under the control of the controller 100, and the frequency of the applied signal corresponds to a frequency for capacitance of a common touch sensor to be changed. The frequency that the touch sensor equipped in the external device 210 may detect may vary by settings, and is not limited to one form of the present disclosure.

The communicator 80 may receive information about a display area of the external device 210 set by the external device 210. For example, as the electrode 50 transmits a frequency signal to the touch sensor of the external device 210 held in the holding groove 350, the external device 210 may determine display areas hidden and not hidden by the holding groove 350. The external device 210 may transmit information about the display areas of the external device 210, and the communicator 80 may receive and forward the information to the controller 100.

Furthermore, the communicator 80 may transmit image data generated by the controller 100 according to the display area information of the external device 210 to the external device 210, exchange information with the external device 210 over a network, and fetch information stored in an external storage server or store information in the storage server.

The communicator 80 may include at least one of a Bluetooth communication module for communicating one-to-one with a single external device or one-to-many with a plurality of external devices, a Wireless Fidelity (Wi-Fi) communication module for accessing a Local Area Network (LAN) through a wireless Access Point (AP), and a short-range communication module, such as a Zigbee communication module to form a short-range communication network between the controller 100 and the external device 210. However, the communication module included in the communicator 180 is not limited to the Bluetooth communication module, the Wi-Fi communication module, and the short-range communication module, but may include any other communication module for performing communication according to various communication protocols.

The memory 90 may store a control program or control data to control the vehicle 1 in accordance with one form of the present disclosure, or store control command data generated by the controller 100.

Specifically, the memory 90 may store information about a display area of the external device 210 set up by the external device 210, and information about a display area to display a screen, for each type of the external device 210 held in the holding groove 350. For example, when the external device 210 is held in the holding groove 350, information about areas hidden and not hidden by the holding groove 350 may be stored in the memory 90 in advance. The controller 100 may not receive the information about a display area from the external device 210 through the communicator 80, but may generate image data to reconstruct a screen to be displayed in a display area of the external device 210 held in the holding groove 350 based on the data stored in the memory 90.

The memory 90 may include storage media in at least one type of flash memory, hard disk, multimedia card micro type memory, card type memory (e.g., SD or XD memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, and optical disk.

The controller 100 may generate image data to reconstruct a screen to be displayed in the external device 210 according to information about a display area of the external device 210 set up by the external device 210. Specifically, the controller 100 may receive the information about a display area set up by the external device 210 through the communicator 80, or generate image data to display a screen in a display area not hidden by the holding groove 350 based on the display area information of the external device 210.

The controller 100 may generate the image data based on the display area information of the external device 210, to prevent a screen from being displayed in the hidden display area as the external device 210 is inserted into the holding groove 350 while allowing the screen to be displayed in the non-hidden area.

For this, the controller 100 may generate image data to reconstruct a layout of the screen to be displayed in the display area of the external device 210, and/or generate image data to reconstruct at least one of size, number, type, display area and position of contents to be displayed in the display area.

The controller 100 may be implemented in an array of multiple logic gates, or in a combination of a universal microprocessor and a memory that stores a program executable in the microprocessor.

FIGS. 7 to 10 are perspective views illustrating electrodes arranged in a holding groove.

Figure 7:
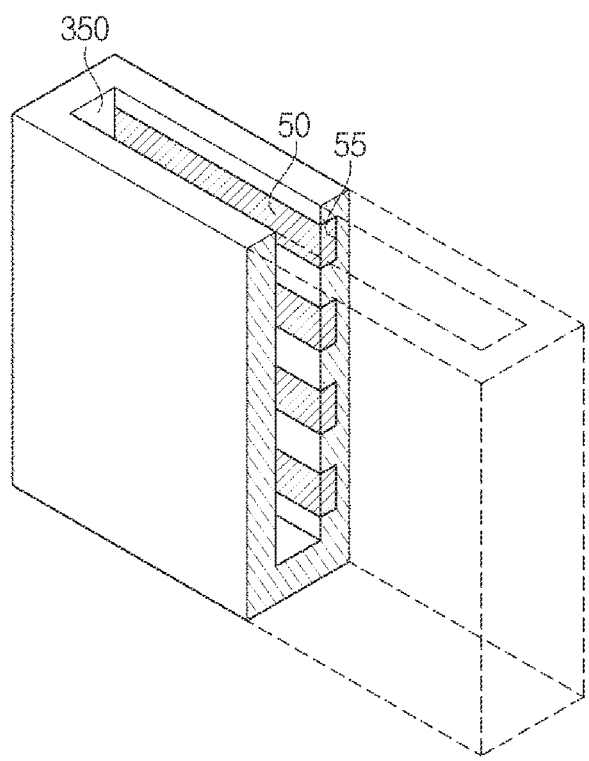
FIGS. 7 to 10 are perspective views illustrating electrodes arranged in a holding groove.

Referring to FIG. 7, the holding groove 350 may include an electrode 50 for transmitting a frequency signal to the external device 210. The shape of the holding groove 350 to hold the external device 210 has no limitation, but in the following description, a rectangular box shape will be taken as an example of the shape of the holding groove 350, for convenience of explanation.

The holding groove 350 may have a concave form to hold the external device 210, and the electrode 50 for transmitting a frequency signal may be arranged on the inside of the holding groove 350. There are no limitations on the number of the electrodes 50, which may vary by depth and shape of the holding groove 350, and the electrode 50 may be installed at any place allowing the frequency signal to be transmitted to the external device 210.

The electrode 50 may be arranged in the holding groove 350 in the LDS method using a laser process, or may be implemented as a touch electrode using the FPCB.

As for the electrode 50 processed in the LDS method, the electrode 50 may be directly inserted into the holding groove 350 without limitation on its installation position and may secure durability even in thin thickness.

As shown in FIG. 7, pattern grooves 55 may be horizontally formed on the inside of the holding groove 350 through a laser process. The pattern grooves 55 may be formed by irradiating laser to a molded material to form the holding groove 350, and the electrode 50 may be installed in the pattern grooves 55.

As the laser is irradiated to the molded material forming the holding groove 350 to form the pattern grooves 55, the pattern grooves 55 may be reduced to metal by heat generated while the grooves are being formed, and the reduced metal part may constitute a metal seed in the pattern groove 55.

The electrode 50 is formed by being plated on the pattern groove 55. A plating process on the metal seed may use a technology commonly known to the public, so the detailed description will be omitted herein. Alternatively, the electrode 50 may be formed by a deposition process, or may even be formed by a combination of the plating and deposition processes.

The electrode 50 may include copper plating, and may further plate the copper plating with nickel (Ni) to prevent oxidization. Meanwhile, if gold plating is used, it may improve conductivity. Furthermore, although not shown, the inside of the holding groove 350 where the electrode 50 is installed may be coated with a painting layer to protect the electrode 50 against external shocks or contaminants.

The electrode 50 may be one or many in number, and may have any shape and any installation gap.

Referring to FIG. 7, the electrode 50 in accordance with one form of the present disclosure may be horizontally arranged on the inside of the holding groove 350. The number of the electrodes 50 to be arranged in the holding groove 350 may vary by depth of the holding groove 350 and/or even by the gap between the plurality of electrodes 50.

As the external device 210 is held in the holding groove 350, the electrode 50 may transmit a frequency signal applied from the frequency generator 70 to the external device 210, and the external device 210 may recognize touch coordinates that have received the frequency signal based on a change in capacitance of the touch sensor equipped in a part coming into contact with the electrode 50. Based on the recognized touch coordinates, display areas hidden and not hidden as the external device 210 is held in the holding groove 350 may be determined.

Figure 8:
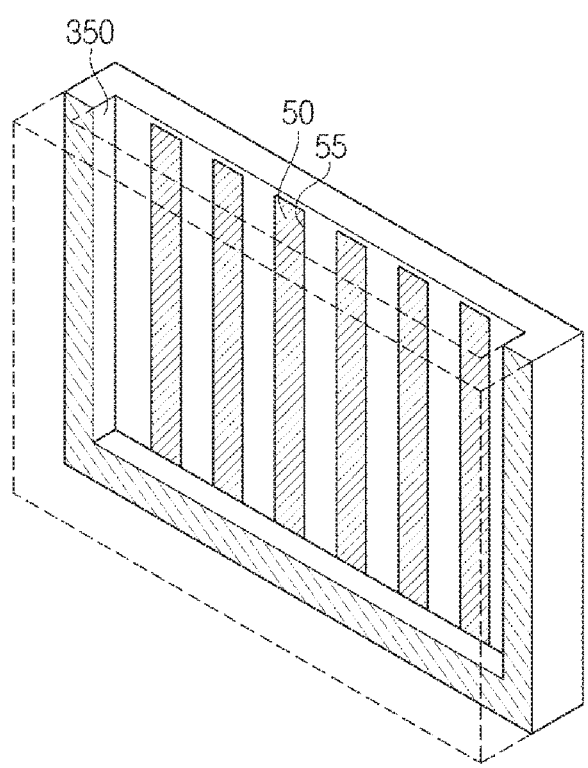

Referring to FIG. 8, the electrode 50 in accordance with one form of the present disclosure may be vertically arranged on the inside of the holding groove 350. Pattern grooves 55 may be vertically formed on the inside of the holding groove 350 through a laser process. The number of the electrodes 50 to be arranged in the holding groove 350 may vary by width of the holding groove 350 and/or even by the gap between the plurality of electrodes 50.

Figure 9:
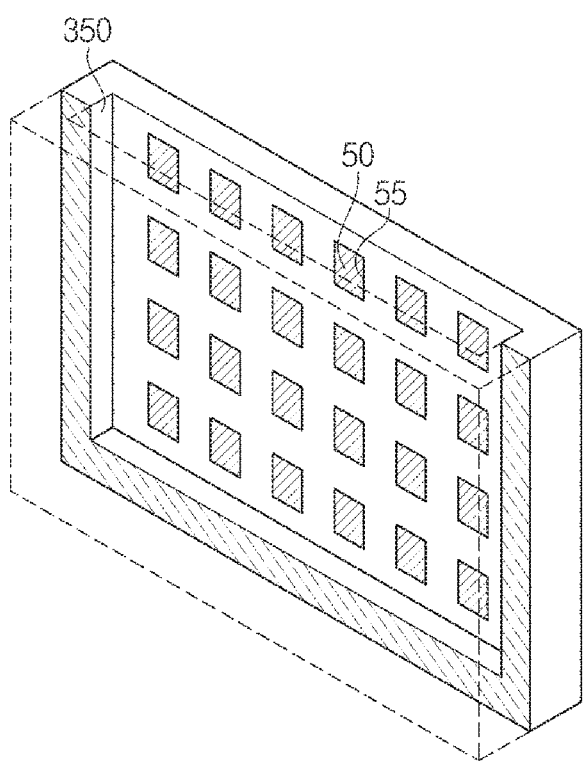

Referring to FIG. 9, a plurality of electrodes 50 in accordance with one form of the present disclosure may be arranged on the inside of the holding groove 350 in the form of tiles with constant gaps. To install the plurality of electrodes 50, pattern grooves 55 may also be arranged on the inside of the holding groove 350 in the form of tiles with constant gaps. The number of the plurality of electrodes 50 to be arranged in the holding groove 350 may vary by length or width of the holding groove 350 and/or even by the gap between the plurality of electrodes 50.

Figure 10:
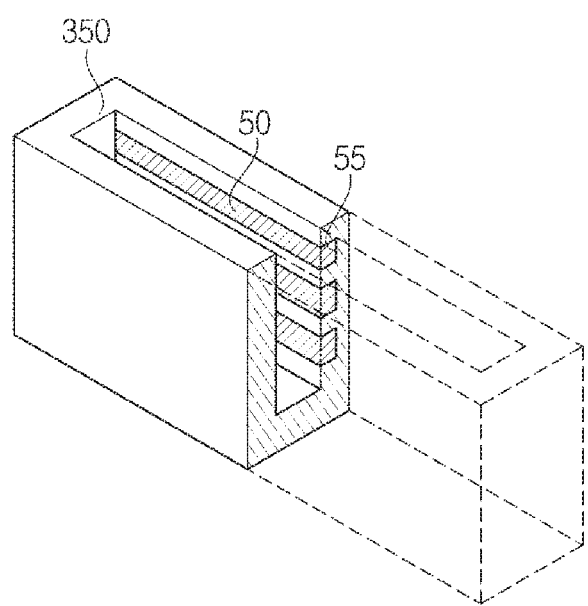

Referring to FIG. 10, depth of the holding groove 350 in accordance with one form of the present disclosure may be shallower than what is shown in FIG. 7. That is, the holding groove 350 formed in the vehicle 1 may have various depths in different forms, and the size or shape of the external device 210 to be held may vary by the depth.

The shallower the depth of the holding groove 350, the fewer the number of the electrodes 50 to be formed on the inside. For example, assuming that a plurality of electrodes 50 are formed on the inside of the holding groove 350 with the same gap, fewer electrodes 50 may be installed because the holding groove 350 of FIG. 10 is shallower than that of FIG. 7.

Figure 11:
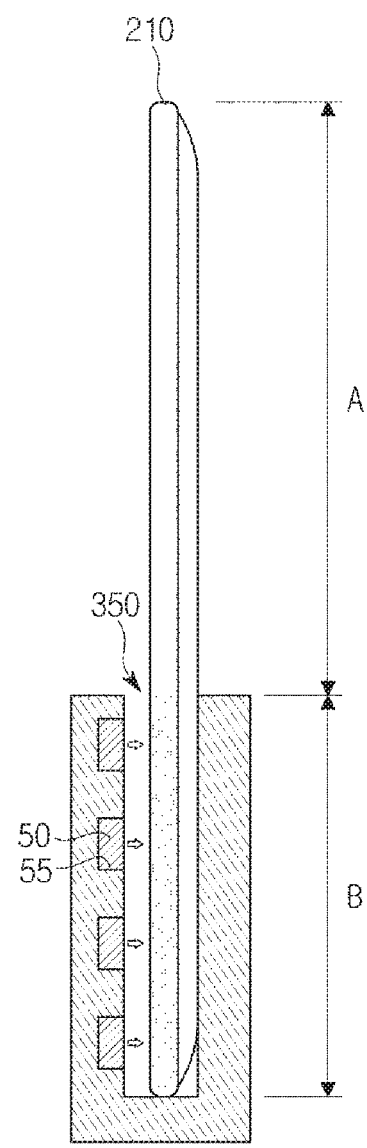
FIG. 11 is a side view of an external device held in a holding groove.
Figure 12:
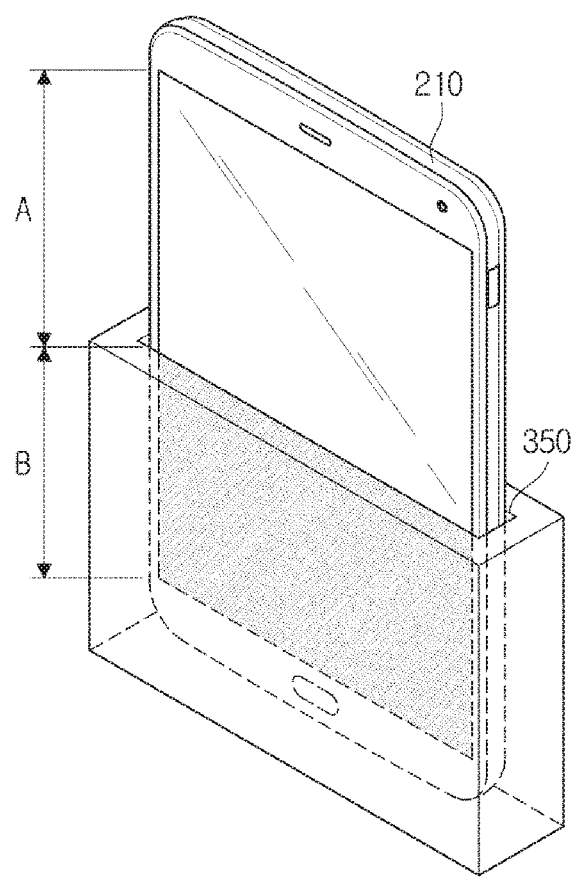
FIG. 12 is a front view of an external device held in a holding groove.
Figure 13:
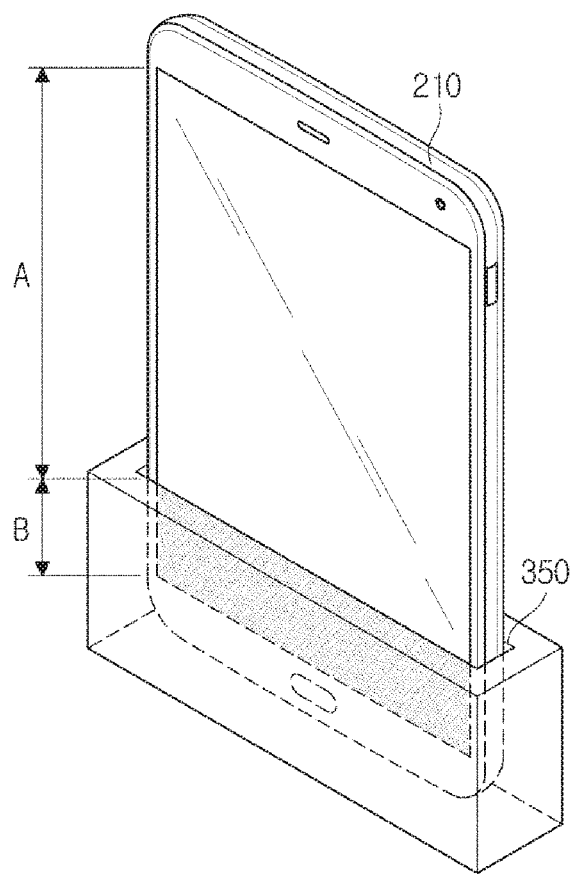
FIG. 13 is a side view of an external device held in a holding groove.

FIG. 11 is a side view of an external device held in a holding groove, FIG. 12 is a front view of an external device held in a holding groove, and FIG. 13 is a side view of an external device held in a holding groove.

Referring to FIGS. 11 and 12, the external device 210 may be held in the holding groove 350 by being inserted thereto. Although there are no limitations on the size and shape of the external device 210 to be held in the holding groove 350, the external device 210 may be stably held when the dimensions (breadth or length and thickness) of the external device 210 are smaller than those (breadth and length) of the holding groove 350.

While the external device 210 is held in the holding groove 350, the frequency generator 70 may apply a frequency signal to the electrode 50 formed in the holding groove 350 under the control of the controller 100, and the electrode 50 may transmit the frequency signal to the external device 210.

As shown in FIG. 11, the frequency signal transmitted from the electrode 50 may be received by a receiver, such as a touch sensor arranged on the front of the external device 210, and the external device 210 may determine a display area hidden as the external device 210 is held in the holding groove 350 based on the received signal.

Referring to FIGS. 11 and 12, as the external device 210 is held in the holding groove 350, there may be an area B hidden by the holding groove 350. The area B may correspond to a display area for outputting an image unless the external device 210 is held in the holding groove 350, but may become a hidden area that the user may not see even if the external device 210 outputs an image through the area B while the external device 210 is held in the holding groove 350.

Accordingly, since the area B hidden by the holding groove 350 may not provide proper image information to the user even if it outputs the image, the controller 100 may control an image to be output in a display area A not hidden by the holding groove 350.

Specifically, the controller 100 may generate image data to reconstruct a screen to be displayed in the external device 210 such that an image is output in the area A not hidden by the holding groove 350 of the entire area without a loss in providing information to the user.

Referring to FIG. 13, the external device 210 may be held in the holding groove 350, which is shallower than what is shown in FIG. 12. If the depth of the holding groove 350 is shallow, the area B of the external device 210 hidden by the holding groove 350 decreases, and so the user may watch an image through the larger area A not hidden by the holding groove 350.

Furthermore, if the depth of the holding groove 350 is shallow, the number of the electrodes 50 formed on the inside of the holding groove 350 becomes fewer, the display area set up by the external device 210 varies accordingly, and thus the controller 100 may reconstruct a screen to be output in the display area A of the external device 210 not hidden by the holding groove 350.

Figure 14:
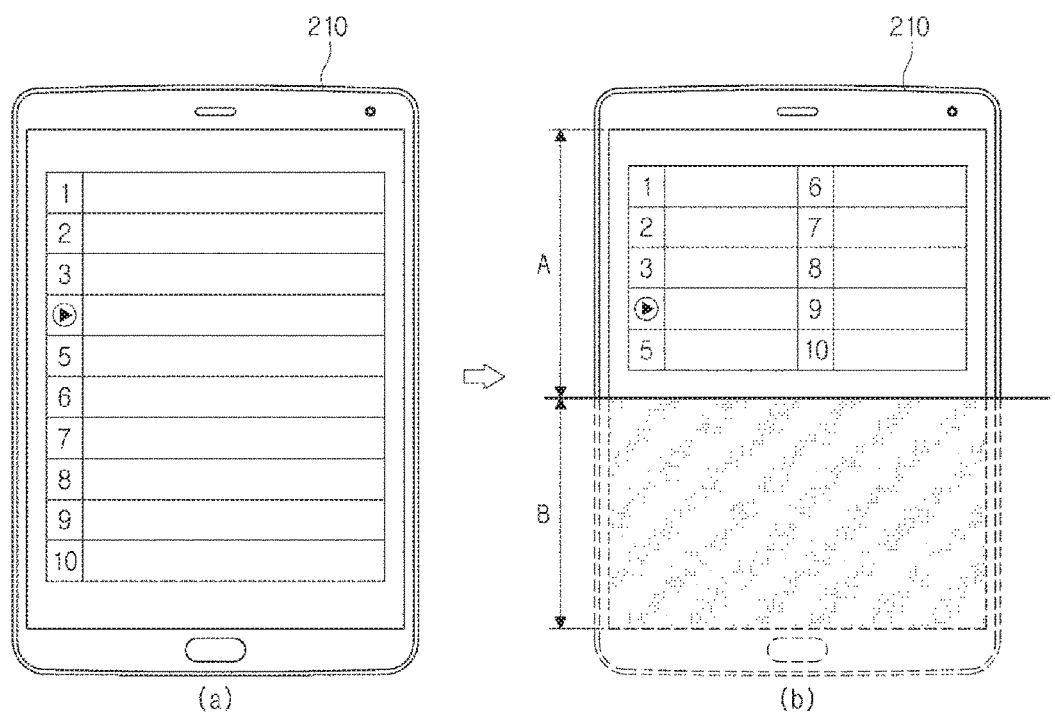
FIGS. 14 and 15 illustrate screens displayed in a display area of an external device based on reconstructed image data.
Figure 15:
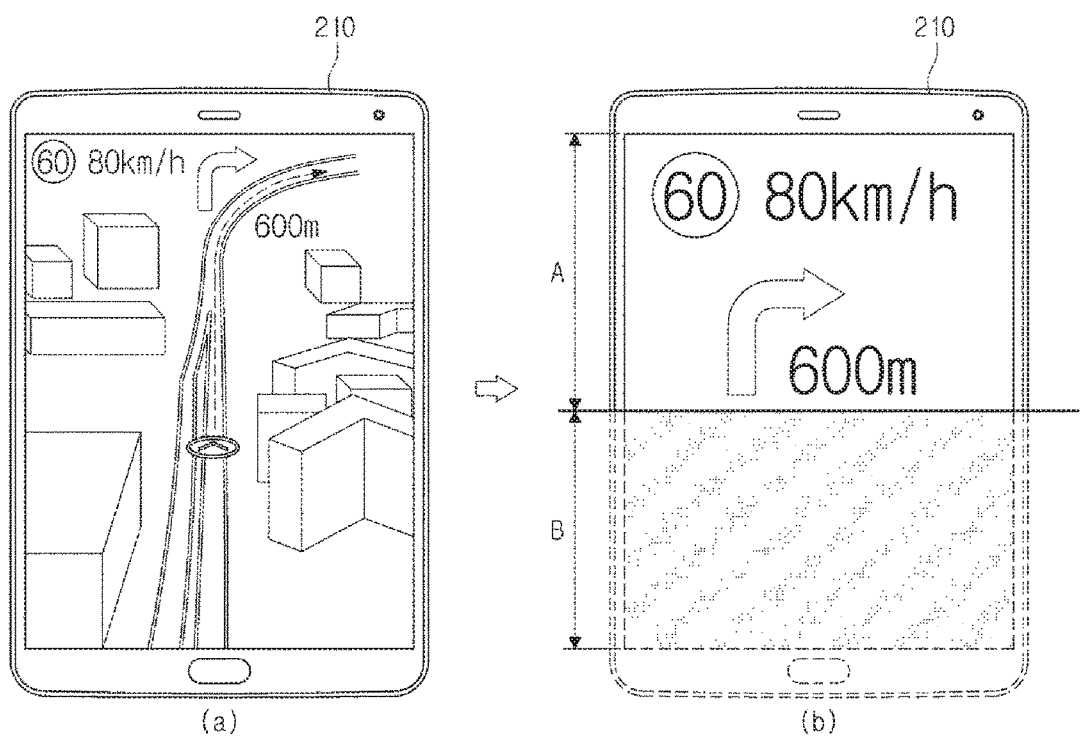

FIGS. 14 and 15 illustrate screens displayed in a display area of an external device based on reconstructed image data.

Referring to FIG. 14, an image is output in the entire display area of the external device 210 before the external device 210 is held in the holding groove 350. For example, as shown in (a) of FIG. 14, a music play list may be output in the entire display area of the external device 210, in which case the display area of the external device 210 is large enough to display the music play list all arranged and output in a line.

As the external device 210 is held in the holding groove 350, a frequency signal transmitted from the electrode 50 may be received by a receiver, such as a touch sensor arranged on the front of the external device 210, and the external device 210 may determine a display area hidden as the external device 210 is held in the holding groove 350 based on the received signal and send the hidden area information to the controller 100 through the communicator 80.

As described above, while the external device 210 is held in the holding groove 350, there may be the area B hidden by the holding groove 350 that the user may not watch an image even if the image is being output in the area B, so the controller 100 may control an image to be output in the area A not hidden by the holding groove 350.

As shown in (b) of FIG. 14, the controller 100 may generate image data for a screen to be output in the display area A not hidden by the holding groove 350. In this case, the controller 100 may generate image data to reconstruct a layout of the screen to be displayed in the display area A, and/or generate image data to reconstruct at least one of size, number, type, display area and position of contents to be displayed in the display area A.

Referring to (b) of FIG. 14, the controller 100 may generate image data for an image not to be output in the display area B of the external device 210 hidden by the holding groove 350, and change and display a layout of the music play list into two lines, which is otherwise output in a line as shown in (a), to output the music play list in the non-hidden display area A. In other words, since the display area A that the user may see becomes narrow due to the display area B hidden by the holding groove 350, the controller 100 may generate image data of a screen to be output to fit the narrow area.

Referring to FIG. 15, a navigation image is output in the entire display area of the external device 210 before the external device 210 is held in the holding groove 350. For example, as shown in (a) of FIG. 15, a navigation image for helping the driver get directions through the entire display area of the external device 210, in which case the display area of the external device 210 is large enough to fully display the directions including map information.

While the external device 210 is held in the holding groove 350, there may be the area B hidden by the holding groove 350 that the user may not watch an image even if the navigation image is being output in the area B, so the controller 100 may control the navigation image to be output in the area A not hidden by the holding groove 350.

Referring to (b) of FIG. 15, the controller 100 may generate image data to output key information, such as information about speed, direction, etc., essentially required in directions among the navigation information as shown in (a) in order for the external device 210 not to output the navigation image in the display area B hidden by the holding groove 350 but to output it in the non-hidden display area A.

That is, the full navigation information including the information about speed and direction of the vehicle 1 may be displayed in (a), but just the information about speed and direction of the vehicle 1 may be displayed in (b).

Figure 16:
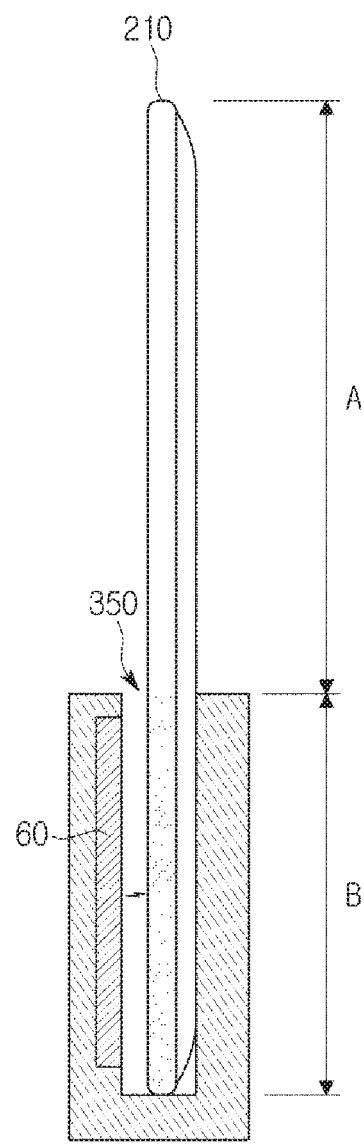
FIG. 16 is a side view of an external device held in a holding groove with an identifier formed therein.

FIG. 16 is a side view of an external device held in a holding groove with an identifier formed therein.

Referring to FIG. 16, the identifier 60 arranged inside of the holding groove 350 may recognize display area information of the external device 210 held in the holding groove 350. Specifically, when the external device 210 is held in the holding groove 350, the identifier 60 may recognize display area information stored in the external device 210, and the controller 100 may generate image data for reconstructing a screen to be displayed in the external device 210 based on the recognized display area information.

The identifier 60 may determine the area B hidden and the area A not hidden by the holding groove 350 in the entire display area of the external device 210 in at least one of bar code, QR code, text data, data matrix, recognition pattern, NFC, and RFID methods.

Specifically, when the external device 210 is held in the holding groove 350, the identifier 60 may recognize information about a type and display area of the external device 210 in e.g., the NFC method, and even recognize information about how large a display area not hidden by the holding groove 350 is while the corresponding external device 2120 is held in the holding groove 350.

The identifier 60 may send the recognized information to the controller 100, which may in turn, reconstruct image data to be output in the display area A of the external device 210 based on the information.

Information recognized by the identifier 60 may be stored in the memory 90 in advance, in which case, if the identifier 60 recognizes the external device 210 held in the holding groove 350, the controller 100 may generate image data using the corresponding information among the information stored in the memory 90 without regard to the external device 210 determining a display area.

Furthermore, an application may be installed in the external device 210 for setting up a display area as the external device 210 is held in the holding groove 350. In this case, when the device 210 is held in the holding groove 350, the controller 100 may generate image data corresponding to a display area of the external device 210 determined based on the information stored in the application or operation of the application.

Figure 17:
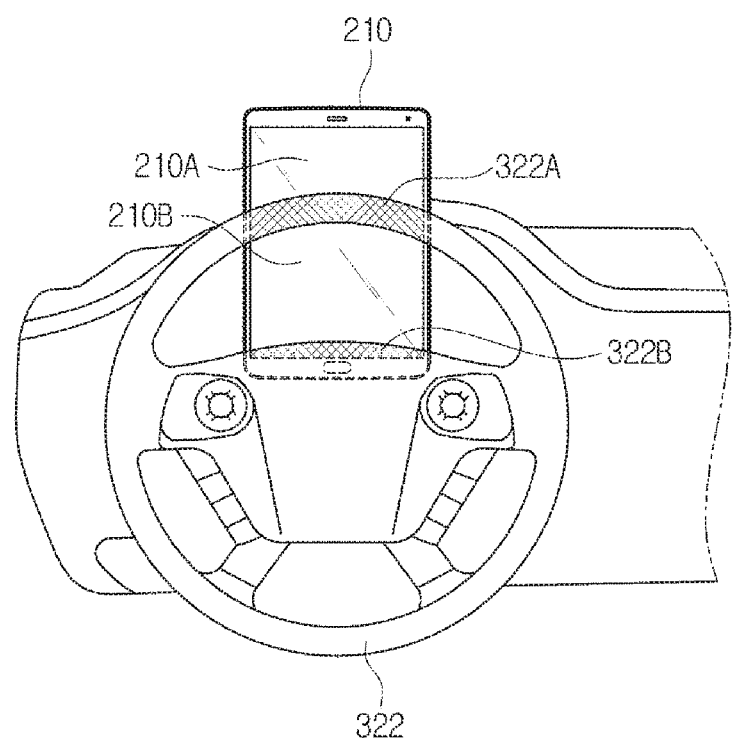
FIGS. 17 and 18 illustrate display areas determined when an external device is held on an instrument panel and corresponding image data creation.
Figure 18:
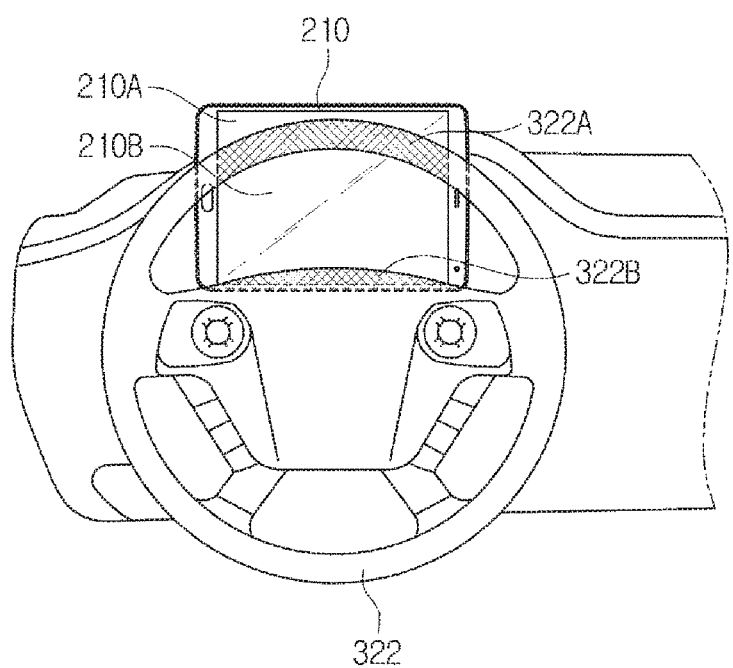

FIGS. 17 and 18 illustrate display areas determined when an external device is held on an instrument panel and corresponding image data creation.

FIG. 17 shows the external device 210 held vertically in the instrument panel 330, and FIG. 18 shows the external device 210 held horizontally in the instrument panel 330.

Referring to FIGS. 17 and 18, as the external device 210 is held in the instrument panel 330, there may be an area 322A, 322B hidden by the wheel for gripping 322 in the display area.

Accordingly, the controller 100 may generate image data such that an image is output in an area 210A, 210B not hidden by the wheel for gripping 322 in the display area.

Specifically, depending on the type of the external device 210 held in the instrument panel 330, information about the display area 322A, 322B hidden by the wheel for gripping 322 may be stored in the memory 90 in advance.

The controller 100 may generate image data based on the stored information about the display area such that a reconstructed screen is output in the display area 210A, 210B not hidden by the wheel for gripping 322.

In one form of the present disclosure, the electrode 50 may be arranged on the back of the wheel for gripping 322, and the external device 210 may send the controller 100 information about a display area set up by receiving a frequency signal transmitted from the electrode 50.

Similar to what is described in FIG. 11, the controller 100 may generate image data based on the received display area information such that a screen is output in the display area 210A, 210B not hidden by the wheel for gripping 322 in the entire display area of the external device 210.

Furthermore, in another form of the present disclosure, the identifier 60 may be arranged on the back of the wheel for gripping 322, and as the external device 210 is held in the instrument panel 330, may recognize the display area information stored in the external device 210, and the controller 100 may generate image data based on the recognized display area information.

Specifically, when the external device 210 is held in the instrument panel 330, the identifier 60 may recognize information about a type and display area of the external device 210 in e.g., the NFC method, and even recognize information about the display area not hidden by the wheel for gripping 322 while the corresponding external device 2120 is held in the instrument panel 330.

The identifier 60 may send the recognized information to the controller 100, which may in turn, reconstruct image data to be output in the display area 210A, 210B of the external device 210 based on the information.

FIG. 19 is a flowchart illustrating a method for controlling a vehicle, and FIG. 20 is a flowchart illustrating a method for controlling a vehicle.

Referring to FIG. 19, when the external device 210 is held in the holding groove 350, the electrode 50 arranged on the inside of the holding groove 350 transmits a frequency signal to the external device 210 held in the holding groove 350, in 500.

Specifically, the frequency generator 70 may apply a frequency signal to the electrode 50 under the control of the controller 100. The frequency signal transmitted by the electrode 50 to the external device 210 may be received by a touch sensor arranged in the external device 210, based on which, a display area of the external device 210 may be set up according to coordinate information of the external device 210.

The controller 100 receives information about a display area of the external device 210 set up by the external device 210 through the communicator 80, in 510. Specifically, based on the frequency signal received from the electrode 50, the external device 210 may distinguish display areas hidden and not hidden by the holding groove 350 in the entire display area of the external device 210 from each other, and send the distinguished information to the controller 100.

The controller 100 generates image data to reconstruct a screen to be displayed in the external device 210 based on the display area information of the external device 210, in 520. Specifically, as the external device 210 is held in the holding groove 350, the layout of an image may be reconstructed for the screen to be output in an area determined by the external device 210, and image data may be generated to reconstruct at least one of the size, number, type, display area and position of contents to be displayed in the display area.

The communicator 80 transmits the image data generated by the controller 100 to the external device 210, in 530, and the external device 210 may output a screen in a display area not hidden by the holding groove 350 based on the image data generated by the controller 100.

Referring to FIG. 20, when the external device 210 is held in the holding groove 350, the identifier 60 arranged on the inside of the holding groove 350 recognizes information about a display area of the external device 210, in 600.

Specifically, when the external device 210 is held in the holding groove 350, the identifier 60 recognizes display area information stored in the external device 210, and the controller 100 generates image data for reconstructing a screen to be displayed in the external device 210, in 610. Information recognized by the identifier 60 may be stored in the memory 90 in advance, in which case, if the identifier 60 recognizes the external device 210 held in the holding groove 350, the controller 100 may generate image data using the corresponding information among the information stored in the memory 90 without regard to the external device 210 determining a display area.

The controller 100 may reconstruct the layout of an image for the screen to be output in a display area of the external device 210 not hidden by the holding groove 350, and may generate image data to reconstruct at least one of the size, number, type, display area and position of contents to be displayed in the display area.

The communicator 80 transmits the image data generated by the controller 100 to the external device 210, in 620, and the external device 210 may output a screen in a display area not hidden by the holding groove 350 based on the image data generated by the controller 100.

Meanwhile, the forms of the present disclosure may be implemented in the form of recording media for storing instructions to be carried out by a computer. The instructions may be stored in the form of program codes, and when executed by a processor, may generate program modules to perform operation in the forms of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

According to forms of the present disclosure, the user may freely hold an external device in a holding groove formed in a vehicle, and thus, not only a driver but also a passenger may effectively enjoy multimedia functions through the external device. Furthermore, a screen may be reconstructed to be displayed in a display area determined as the external device is held in the holding groove, thereby effectively providing information.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle comprising:
  a holding groove configured to hold an external device when the external device is inserted thereto;
  an electrode positioned in the holding groove that is configured to transmit a frequency signal to the external device;
  a controller configured to:
    generate image data to reconstruct a screen to be displayed on the external device according to information about a display area of the external device set up by the external device based on the frequency signal, wherein the information about the display area of the external device is information regarding the display area to be displayed on the screen for each type of the external device in the holding groove;
generate the image data to reconstruct a layout of the screen to be displayed in the display area; and
generate the image data to reconstruct at least one of a size, a number, a type, the display area, or a position of contents to be displayed in the display area; and
a communicator configured to transmit the image data to the external device,
wherein the electrode is positioned only on one side of an inside of the holding groove.

2. The vehicle of claim 1, wherein the holding groove comprises a pattern groove formed the inside of the holding groove in a laser process.

3. The vehicle of claim 2, wherein at least one of the electrode is positioned in the pattern groove.

4. The vehicle of claim 1, wherein the electrode is configured to transmit the frequency signal to the external device in order to change capacitance of a touch sensor arranged in the external device.

5. The vehicle of claim 1, wherein the controller is configured to generate the image data based on the information about the display area of the external device set up by the external device, such that the screen is not displayed on the display area hidden when the external device is inserted into the holding groove.

6. The vehicle of claim 1, wherein the controller is configured to generate image data to reconstruct a layout of the screen to be displayed on the display area of the external device set up by the external device.

7. The vehicle of claim 1, wherein the controller is configured to generate image data to reconstruct at least one of size, number, type, display area, or display position of contents to be displayed on the display area of the external device set up by the external device.

8. The vehicle of claim 1, further comprising:
a frequency generator configured to apply the frequency signal to the electrode, wherein the electrode is configured to transmit the frequency signal applied from the frequency generator to the external device.

9. The vehicle of claim 1, wherein the communicator is configured to receive the information about the display area of the external device set up by the external device.

10. The vehicle of claim 1, further comprising:
a memory configured to store the information about the display area of the external device set up by the external device.

11. The vehicle of claim 1, wherein the holding groove is positioned in at least one of a dashboard, a center fascia, a gearbox, or an instrument panel of the vehicle.

12. A vehicle comprising:
a holding groove configured to hold an external device when the external device is inserted thereto;
an identifier positioned in the holding groove, wherein the identifier is configured to recognize display area information of the external device;
a controller configured to:
generate image data to reconstruct a screen to be displayed on the external device based on the display area information of the external device, wherein the display area information of the external device is information regarding the display area to be displayed on the screen for each type of the external device in the holding groove;
generate the image data to reconstruct a layout of the screen to be displayed in the display area; and
generate the image data to reconstruct at least one of a size, a number, a type, the display area, or a position of contents to be displayed in the display area; and
a communicator configured to transmit the image data to the external device,
wherein the identifier is positioned only on one side of an inside of the holding groove.

13. The vehicle of claim 12, wherein the identifier is configured to recognize the display area information of the external device by at least one way of bar code, QR code, text data, data matrix, recognition pattern, NFC, or RFID.

14. A method for controlling a vehicle, the method comprising:
transmitting a frequency signal to an external device by an electrode;
receiving information about a display area of the external device set up by the external device based on the frequency signal;
generating image data to reconstruct a screen to be displayed on the external device based on the display area information of the external device, wherein the display area information of the external device is information regarding the display area to be displayed on the screen for each type of the external device in a holding groove; and
transmitting the image data to the external device,
wherein generating the image data further comprises:
generating the image data to reconstruct a layout of the screen to be displayed in the display area; and
generating the image data to reconstruct at least one of a size, a number, a type, the display area, or a position of contents to be displayed in the display area,
wherein the electrode is positioned only on one side of an inside of the holding groove.

15. The method of claim 14, wherein transmitting the image data to the external device comprises transmitting the frequency signal to the external device in order to change capacitance of a touch sensor arranged in the external device.

16. The method of claim 14, wherein generating the image data comprises generating the image data based on the information about the display area of the external device set up by the external device, such that the screen is not displayed on the display area hidden when the external device is inserted into a holding groove arranged in the vehicle.

17. The method of claim 14, wherein generating the image data comprises generating the image data to reconstruct a layout of the screen to be displayed on the display area of the external device set up by the external device.

18. The method of claim 14, wherein generating the image data comprises generating the image data to reconstruct at least one of size, number, type, display area, and display position of contents to be displayed on the display area of the external device set up by the external device.

19. The method of claim 14, further comprising:
storing the information about the display area of the external device set up by the external device.

20. A method for controlling a vehicle, the method comprising:
recognizing information about a display area of an external device by an identifier;
generating image data to reconstruct a screen to be displayed on the external device based on display area information of the external device, wherein the display area information of the external device is information regarding the display area to be displayed on the screen for each type of the external device in a holding groove; and transmitting the image data to the external device, wherein generating the image data further comprises:
generating the image data to reconstruct a layout of the screen to be displayed in the display area; and
generating the image data to reconstruct at least one of a size, a number, a type, the display area, or a position of contents to be displayed in the display area, wherein the identifier is positioned only on one side of an inside of the holding groove.

* * * * *